United States Patent
Yokoo

(10) Patent No.: US 10,857,465 B2
(45) Date of Patent: Dec. 8, 2020

(54) SERVER DEVICE, METHOD FOR CONTROLLING THE SAME, COMPUTER-READABLE RECORDING MEDIUM, AND GAME SYSTEM

(71) Applicant: GREE, INC., Tokyo (JP)

(72) Inventor: Chika Yokoo, Tokyo (JP)

(73) Assignee: GREE, INC., Tokyo (JP)

( * ) Notice: Subject to any disclaimer, the term of this patent is extended or adjusted under 35 U.S.C. 154(b) by 206 days.

(21) Appl. No.: 16/108,985

(22) Filed: Aug. 22, 2018

(65) Prior Publication Data

US 2018/0361247 A1 Dec. 20, 2018

Related U.S. Application Data

(63) Continuation of application No. 14/329,872, filed on Jul. 11, 2014, now Pat. No. 10,080,964.

(30) Foreign Application Priority Data

Jul. 12, 2013 (JP) ................. 2013-147123
May 1, 2014 (JP) ................. 2014-094623

(51) Int. Cl.
*A63F 13/58* (2014.01)
*A63F 13/35* (2014.01)
*A63F 13/822* (2014.01)

(52) U.S. Cl.
CPC .............. *A63F 13/58* (2014.09); *A63F 13/35* (2014.09); *A63F 13/822* (2014.09)

(58) Field of Classification Search
CPC .................. A63F 13/58; A63F 13/35
See application file for complete search history.

(56) References Cited

U.S. PATENT DOCUMENTS 6,313,843 B1 11/2001 Tanii et al.
8,353,767 B1 1/2013 Borst et al.
(Continued)

FOREIGN PATENT DOCUMENTS

JP H11-073090 A 3/1999
JP 2001-129258 A 5/2001
(Continued)

OTHER PUBLICATIONS

Sep. 24, 2013 Office Action issued in Japanese Patent Application No. 2013-147123.
(Continued)

*Primary Examiner* — Jason Skaarup
(74) *Attorney, Agent, or Firm* — Oliff PLC

(57) ABSTRACT

A program capable of giving an element of surprise to a game to increase the fun and interest, and achieving effects of raising player's interest in the game and motivation to continue the game, is disclosed herein. The program sets a "personality" such as a preference and a characteristic parameter of a character card (first game content), and sets a "level" of the preference to an item A1 or the like (second game content). Then, the program synthesizes the item. A1 or the like selected by the player with a character card C1, performs a calculation for changing the characteristic parameter of the character card based on the "level," and exhibits a predetermined effect on the character card C1 based on the calculation result of the characteristic parameter of the character card (e.g., when it is greater than or equal to Smax).

21 Claims, 7 Drawing Sheets

(56) References Cited

U.S. PATENT DOCUMENTS

| | | |
|---|---|---|
| 10,080,964 B2 * | 9/2018 | Yokoo .................. A63F 13/822 |
| 2002/0107060 A1 | 8/2002 | Ohnuma et al. |
| 2011/0086702 A1 | 4/2011 | Borst et al. |
| 2012/0052930 A1 | 3/2012 | McGucken |
| 2014/0121026 A1 | 5/2014 | Hashimoto et al. |
| 2014/0128164 A1 | 5/2014 | Ukai et al. |
| 2014/0194178 A1 | 7/2014 | Kawada et al. |
| 2015/0151204 A1 | 6/2015 | Yamaguchi et al. |
| 2015/0174494 A1 | 6/2015 | Yamaguchi |
| 2015/0190715 A1 | 7/2015 | Yamaguchi |

FOREIGN PATENT DOCUMENTS

| | | |
|---|---|---|
| JP | 2002-292127 A | 10/2002 |
| JP | 2003-245473 A | 9/2003 |

OTHER PUBLICATIONS

Feb. 3, 2014 Office Action issued in Japanese Patent Application No. 2013-147123.

Pinna, "Desktop Life Red Canary", Oh! PC, Mar. 1, 2000, vol. 19, No. 3, p. 133, Softbank Publishing Corp., with partial English translation, 6 pages total.

"Rragnarock-online Formal Guide 2009 1st Edition", Jul. 30, 2009, vol. 1, p. 70, Softbank Creative Corp., with partial English translation, 5 pages total.

May 21, 2018 Notice of Allowance and Fee(s) Due issued in U.S. Appl. No. 14/329,872.

Dec. 26, 2017 Office Action issued in U.S. Appl. No. 14/329,872.

Jun. 29, 2017 Office Action issued in U.S. Appl. No. 14/329,872.

Feb. 2, 2017 Office Action issued in U.S. Appl. No. 14/329,872.

Sep. 9, 2016 Office Action issued in U.S. Appl. No. 14/329,872.

Jan. 14, 2016 Office Action issued in U.S. Appl. No. 14/329,872.

Aug. 14, 2015 Office Action issued in U.S. Appl. No. 14/329,872.

\* cited by examiner

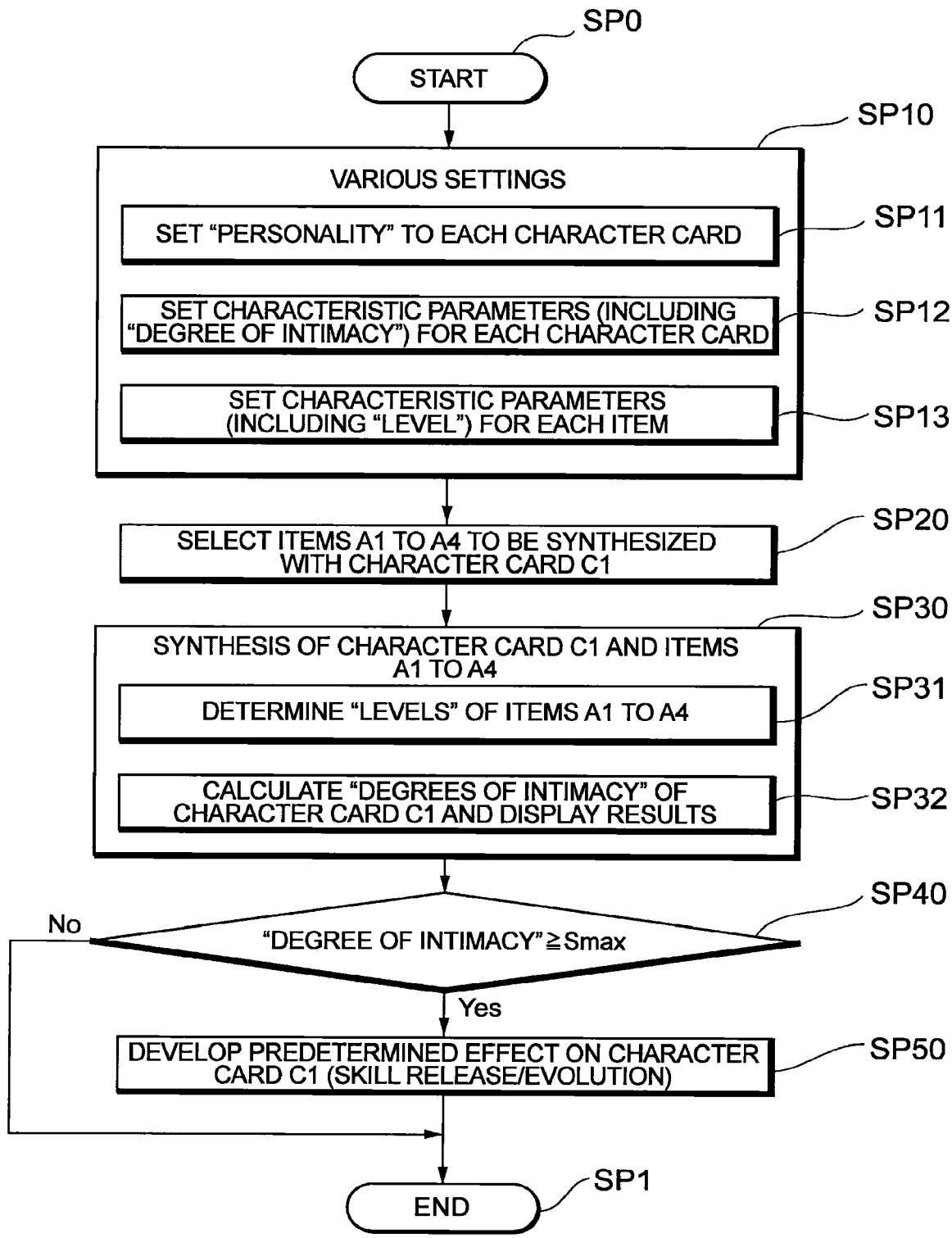

SERVER DEVICE, METHOD FOR CONTROLLING THE SAME, COMPUTER-READABLE RECORDING MEDIUM, AND GAME SYSTEM

CROSS-REFERENCE TO RELATED APPLICATION(S)

This application is a continuation of U.S. application Ser. No. 14/329,872 filed Jul. 11, 2014, which is based on and claims priority under 35 U.S.C. 119 from JP2013-147123 filed on Jul. 12, 2013 and JP2014-094623 filed on May 1, 2014. The contents of the above applications are incorporated herein by reference in their entirety.

BACKGROUND

Disclosed herein are a program and a control method for a game system.

Games provided from a server to mobile terminals operated by players through a communication network have recently achieved popularity, and many game titles have been released using multiple platforms. The kinds and categories of these games cover a lot of ground, and among them, so-called social games that allow multiple players to participate in the same game are in fashion.

The kinds of games distributed as social games cover a lot of ground, such as a card battle type role playing game (RPG) and an action game. In these games, a player can operate characters (player characters) displayed on virtual cards to make the player characters grow through experiences of various events such as versus battles or mini games in game scenes set as so-called quests or the like while collecting various game items.

There is also known a game capable of arbitrarily combining cards associated with the characters or the game items to enhance the levels of characters' abilities (such as toughness, skill, health point, intelligence, attack power, and defense power) corresponding to the cards (which may be called "enhanced synthesis") and to transform the characters into heteromorphic ones or upgrade the characters (which may be called "evolutionary synthesis"). For example, JP2001-129258A discloses a game method delivery system that can use information data on multiple character cards delivered to a cellular phone as a game machine to unite these character cards in order to acquire a new character card, to enable the evolution or cultivation of card characters, or to combine a weapon card with a character card in order to increase the fighting strength of the character.

SUMMARY

It can be said that the enhanced synthesis and evolutionary synthesis of such character cards are one of the techniques effective in raising the fun (enjoyment) of and interest (taste) in and taste of the game. However, in conventional games, the degree of the effect of improving the ability obtained by the enhanced synthesis or the evolutionary synthesis (increase or decrease of various ability parameters) may be totally unknown or unclear due to the display of rough images, or the degree of the effect to be obtained may be manifested in an item with which a character card is combined or presented to a player when both are combined.

As a result of these circumstances, it is common that the effect of the enhanced synthesis or the evolutionary synthesis is totally unknown to the player, or conversely, the result of the enhanced synthesis or the evolutionary synthesis can be known to the player before it is performed. These points lead to losing the element of surprise in the progress of the game, and this is part of what makes the player little interested in the game.

In addition, even though the ability of a character card is enhanced or upgraded as a result of the enhanced synthesis or evolutionary synthesis of character cards, the character card may be just a player character for the player as one means to make the game progress and/or nothing but a collection target equivalent to the item. In this regard, there has been no attempt to add a more value to the character card in the conventional games.

The invention disclosed herein has been made in view of such a situation, and it is an object thereof to provide a program and a control method for a game system, which can give an unexpected, unpredictable quality to a game to further increase the fun of and interest in the game in order to raise player's interest in the game and motivation to continue the game, and which can further add a new value to a game content such as a character card owned by a player in a relationship with the player.

In order to solve the above problems, the server device according to the invention disclosed herein provides a game using a first game content and second game content different from the first game content. The server device comprises an information storage unit storing information related to the game; and a control unit for accessing the information and executing an operation related to the game. The control unit executes the steps of: setting a "personality" to the first game content; setting a characteristic parameter of the first game content; setting a "level" about the personality (associated with the personality) of the first game content, the level being concealed from the player, as one of characteristic parameters of the second game content; causing the player to select any of the second game contents; and changing the characteristic parameter of the first game content based on the "personality" of the first game content and the "level" of the selected second game content.

Here, the "player" means a user who plays the game performed by the program according to the invention disclosed herein, normally an operator of a terminal device such as a mobile device or a game machine having a screen with images of the game displayed thereon. The characteristic parameter of the first game content itself or the parameter value thereof can vary or be changed due to a growth or change of the first game content. For example, the characteristic parameter of the first game content includes "degree of intimacy" (e.g., represented by a numerical parameter) between a player and the first game content, a skill, move, or weapon being peculiar to the first game content, a special skill, move, or weapon which the first game content is good at (skillful), or the like.

The "game content" comprises characters and goods handled in virtual space of the game (virtual game space), and cards and items representing or associated with the characters and goods, which is a concept including so-called "objects" in general. The "game content" may evoke the characters and goods directly or indirectly, may be displayed as still images or moving images or a combination thereof, or as mere character information rather than the images. In some cases, the "game content" may not be visually recognizable. For example, the "game content" may be recognizable through the auditory sense alone such as audio information. The "first game content" and the "second game content" are both kinds of "game content" mentioned above, and the first words ("first" and "second") indicate that both are different from each other. The "first game content" and the "second game content" are not particularly limited as long as both can be combined and synthesized. As will be described later, a virtual card (character card) that represents a character is typically cited as the "first game content," and an item that represents an article of goods is typically cited as the "second game content."

Further, for example, a preference for food, goods, or a hobby (such as liking/disliking or strong/weak points) is cited as the "personality" set to the first game content. Further, the "level" about the "personality" of the first game content as one of the characteristic parameters of the second game contents indicates the degree, level, strength, condition, or increase/decrease of the "personality." For example, when the first game content is a human or animal character, the "personality" is a preference for food, and the second game contents are food or other articles of taste, the degrees or states of liking/disliking of food are cited as the "levels" of preferences for these kinds of food and the like, such as love, like, dislike, hate, and neutral.

Then, in the game performed by such a program, a player can generally participate in the game through a character taking an active part, acting, and thinking in virtual game space on behalf of the player, and the first game content associated with the character. Further, the characteristic parameter of the first game content is changed based on the "level" of the second game content associated with the "personality" of the first game content depending on a combination of the first game content owned by the player and the second game content selected by the player.

In other words, the characteristic parameter of the first game content can be thus changed by providing a "personality" for the first game content owned by the player and combining the first game content with a second game content having a "level" associated with the "personality." As a result, the characteristic parameter of the first game content is made different for each first game content owned by the player, and hence differences in the degree of ties between respective the first game content and the player can be generated. This can ferment (encourage) the player's attachment (feeling of commitment) to the first game content, and hence increase variation in the progress of the game.

Further, the "level" set to the second game content is concealed from the player, and the player can infer the "level" set to the second game content by learning the result of a change in the characteristic parameter of the first game content. Specifically, when the first game content is a character card, the "personality" is a preference for food, and the second game content is food as previously discussed, the player can read the liking/disliking of the character card for each kind of food. Thus, the player can collect and learn pieces of information on the "levels" related to the preferences for the second game contents to make the game progress advantageously later on or further increase game variation. In this regard, the unpredictable quality of and interest in the game that are not present in conventional games can also be realized.

It is also preferred to further cause the computer to execute a step of making different any of display forms of the first game content, the second game content, and rendition of the game according to the second game content. For example, when the player owns multiple second game contents, and selects two or more from the second game contents to be combined and synthesized with the first game content, it is preferred to display these multiple second game contents in forms different from each other and visually recognizable to the player, or to make different the display form of the first game content and/or the display form of game rendition associated with the second game contents in addition to the display forms of the second game contents. This has the advantages of improving the visibility, distinctiveness, and selectivity of each of first game content and/or the second game content, and making it easy for the player to observationally contemplate the "levels" set to the second game content in consideration of a balance with the "personality" set to the first game content.

Although the "levels" set to the second game contents are concealed from the player as mentioned above, a characteristic parameter of the first game content changed based on the "personality" of the first game content and the "levels" of the second game contents (i.e., the result of a change) may be displayed in a form different for each second game content. This can make it easy for the player to check on or determine the result of the change in the characteristic parameter of the first game content, and enhance the visual effect as a game screen.

Further, for example, if a specific effect is exhibited on the first game content based on the result of the change in the characteristic parameter of the first game content, the above-mentioned enhanced synthesis or evolutionary synthesis can be performed by the combination of the first game content and a second game content. In this case, since the "level" set to the second game content is reflected in the effect to be exhibited by the enhanced synthesis or the evolutionary synthesis, the player can infer the "level" set to the second game content to some extend indirectly from the exhibited effect.

Therefore, it is preferred to further cause the computer to execute a step of exhibiting a specific effect under the control of the program based on the characteristic parameter of the first game content. At this time, the "specific effect" is not particularly limited. For example, an effect of enabling the first game content to use a predetermined skill and/or an effect of changing the ability of the first game content (such as toughness, skill, health point, intelligence, attack power, or defense power) are cited. In other words, an effect obtained by the above-mentioned enhanced synthesis or evolutionary synthesis with the first game content, i.e., an improvement in the ability or the level, a change and a form of the change in the first game content itself, or a functional enhancement is cited as the "specific effect."

More specifically, in this case, when a specific second game content (having a characteristic parameter of the first game content concerned) among the second game contents is combined with the first game content in a state where the characteristic parameter of the first game content is greater than or equal to the preset maximum value, the above-mentioned specific effect may be exhibited. In other words, a threshold value for the characteristic parameter of the first game content that can exhibit the specific effect may be set. It is also preferred to further cause the computer to make the player recognize such a specific second game content. The recognition technique in this case is not particularly limited. For example, a game screen or the like may be provided to indicate that the second game content is specific in such a manner that the player can learn the fact only when the characteristic parameter of the first game content exceeds the threshold value, or rendition may be performed upon combining (synthesizing) the first game content with the specific second game content in a form different from a combination with another second game content, or the display form of the specific second game content itself may be made different from the display form of the other second game content.

Further, the computer may be caused to execute the steps of: setting a specific second game content among the second game content as a trigger to exhibit a specific effect under the control of the program, and setting an appearance probability of the specific effect to the specific second game content as the trigger; and exhibiting the specific effect based on the characteristic parameter of the first game content and the appearance probability. The number of specific second game content in the combination with the first game content may be one or more, and when the number of specific second game content is plural, the specific effect exhibited per specific second game content and/or its appearance probability may be identical to or different from each other.

This leads to holding a lottery based on a probability to which the above-mentioned characteristic parameter of the first game content is added in addition to the appearance probability of the specific effect set to the second game content, i.e., a lottery according to the probability. As a result, it can be determined whether to exhibit the specific effect or not.

Further, it is preferred to change the characteristic parameter of the first game content or the "levels" of the second game contents under the control of the program according to the combination of multiple second game contents.

In such a structure, the characteristic parameter of the first game content can be changed more than a case expected from the level of each of the second game contents depending on the combination of the multiple second game contents, rather than the case where the characteristic parameter of the first game content is always changed according to the "level" of a single second game content. For example, when the first game content is a character card, the "personality" is a preference for food, and the second game content is food as discussed above, a mode of increasing/decreasing the characteristic parameter of the first game content depending on the right or wrong (good or bad) of a preset so-called "combination of foods" (i.e., a combination of multiple second game contents) is cited. In this case, when the "combination of foods" is set to "wrong (bad)" for the character card even if they are all favorite kinds of food for the character card, the characteristic parameter of the first game content can be reduced upon feeding these kinds of food at a time, whereas when the "combination of foods" is set to "right (good)," the characteristic parameter of the first game content can be increased more than the case where each kind of food is fed individually. This enables the player to further develop the game in an unexpected manner.

Even when the "levels" of the second game contents themselves are changed according to the combination of the multiple second game contents, since the characteristic parameter of the first game content can be changed indirectly as a result, depending on the combination of the first game content and a second game content the "level" of which is changed, an effect equivalent to the case of directly changing the characteristic parameter of the first game content can be obtained.

Further, for example, when the "level" of the second game content selected by the player increases the characteristic parameter of the first game content in a state where the characteristic parameter of the first game content exceeds a predetermined value, the characteristic parameter of the first game content may be reduced inversely. For example, when the first game content is a character card, the personality is a preference for food, and the second game content is food as discussed above, a state where the characteristic parameter of the character card is already high enough as a result of giving the character card a lot of favorite food (an example of the state where the characteristic parameter of the first game content exceeds the predetermined value) can be exemplified. At this time, a mode of reducing the characteristic parameter of the first game content with the player because of the fact that the character card is already surfeited even if the favorite food is further fed to the character card is cited.

Furthermore, when multiple players can participate in the game, the computer can be caused to execute a step of combining a second game content selected by one player in the multiple players with a first game content owned by another player in the multiple players, and changing a characteristic parameter of the first game content based on a personality of the first game content owned by the other player and a level of the second game content selected by the one player.

Such a structure is effective in a case where the game is a social game as mentioned above. For example, when the first game content is a character card, the "personality" is a preference for food, and the second game content is food as previously discussed, a mode of feeding food selected by the one player to a character card of the other player (a friend of the one player or the like) is cited. Even in this case, the characteristic parameter of the other player's character card can be increased or decreased depending on the level of the preference set to the given food. This can facilitate the communication between both such as exchange and cooperation therebetween.

In this case, the "levels" set to the second game contents may be made different between respective "personalities" of a first game content owned by one player and a first game content owned by the other player. In other words, such a setting that the preferences of character cards, each functioning as a substitute for a player, are made different according to the difference between the preferences of players can be adopted.

The control method for a game system according to the invention disclosed herein is a method for effectively controlling a game system implemented by the above-mentioned program of the invention, i.e., a control method for a game system comprising a server having an information storage unit storing information related to a game using a first game content and second game content different from the first game content, and a control unit for accessing the information and performing calculations related to the game.

In this method, the control unit performs control processing for setting a "personality" to the first game content, setting a characteristic parameter of the first game content, setting a "level" about the personality of the first game content, the level being concealed from the player, as one of characteristic parameters of the second game content, causing the player to select any of the second game contents, and changing the characteristic parameter of the first game content based on the "personality" of the first game content and the "level" of the selected second game content.

The game system according to the invention disclosed herein is a system comprising a terminal device operated by the above-mentioned player and a server connected to the terminal device through a communication line to provide a game, wherein the server may have an information storage unit storing information related to the game, and a control unit for accessing the information and performing calculations related to the game. In such a system configuration, the control unit performs control processing for setting a "personality" to a first game content, setting a characteristic parameter of the first game content, setting a "level" about the "personality" of the first game content, the level being concealed from the player, as one of characteristic parameters of second game content, causing the player to select any of the second game contents, and changing the characteristic parameter of the first game content based on the "personality" of the first game content and the "level" of the selected second game content.

According to the invention disclosed herein, a "personality" is provided for a first game content owned by a player, a "level" associated with the "personality" is set to a second game content, and both game content are combined to change the characteristic parameter of the first game content. This can ferment the player's attachment to the first game content, and hence increase variation in the game development, giving an unpredictable quality to the game. As a result, the fun of and interest in the game can be drastically increased compared with the conventional, and hence the player's interest in the game and motivation to continue the game can be raised. In addition, a new value can be added to the relationship between the player and the first game content by changing the characteristic parameter of the first game content, and this can bring (introduce), into the game, taste (elaborate performance) or techniques that are not present in the conventional.

BRIEF DESCRIPTION OF THE DRAWINGS

FIG. 1 is a schematic flowchart showing part of a processing procedure in a game performed by one preferred embodiment of a program according to the invention;

DETAILED DESCRIPTION

Figure 2A:
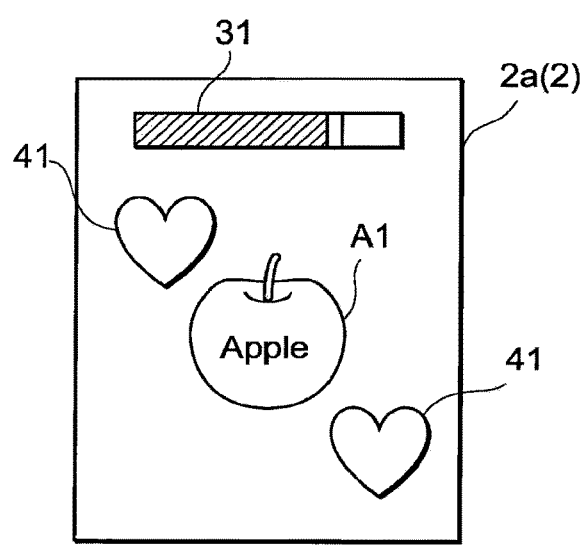
FIGS. 2A to 2D are schematic views as examples of items, showing a state where these items are displayed on a screen of a terminal device operated by a player.

Embodiments of the invention disclosed herein will be described in detail below. Note that the embodiments to be described below are intended only to be illustrative examples to describe the invention, and the invention disclosed herein is not limited to the embodiments alone. Various modifications are possible without departing from the spirit of the invention. Further, those skilled in the art can adopt any other embodiment in which each component or element to be described below is replaced with an equivalent one, and such an embodiment is included in the scope of the invention disclosed herein. Note that positional relations, such as left, right, top, and bottom, indicated as needed are based on those shown in the drawings unless otherwise noted. Note further that various dimension ratios in the drawings are not limited to the dimension ratios shown. In order to facilitate the understanding, the following description will take, as an example, embodiments in which the invention is carried out by using a game information processing apparatus, but as mentioned above, the invention disclosed herein is not limited thereto.

FIG. 1 is a schematic flowchart showing part of a processing procedure in a game performed by one preferred embodiment of a program according to the invention. This game is an example of a card game type RPG in which a story unfolds with a character (player character) as the main character, where the character is displayed on a virtual character card (first game content) owned by a player.

In this game, multiple events and scenes as game scenes (e.g., locations, dungeons, quests) and various conditions for player characters to obtain rewards in these events are set. For example, a player character can obtain a reward by winning in a versus battle or a mini game with an enemy character or an opponent character, or by participating in a meeting event to gather points. Note that these events or scenes such as locations, dungeons, or quests may be hierarchized as mutual or individual structures, or may not be hierarchized.

Here, the "reward" means something that advantageously works on the player character in the progress of the game when the player character owns it, something that places greater values, and further something with a value or a feature set in itself such as rarity. The kind and form of the reward are not particularly limited. Specific examples of rewards include items usable in various events, items capable of developing, strengthening, or recovering player characters, and items the player characters can wear or be armed therewith. These items are not limited to material objects in the virtual space of the game, including numeric values of parameters, such as points, chips, and coins. These items may also be set to be purchasable with other items or points.

Further, this game is so formed that a predetermined item (second game content) can be combined and synthesized with a character card. More specifically, FIG. 1 shows an example of a processing procedure when the character card and the item are synthesized. Note that various kinds of processing (image or screen display, determination, calculation, and the like) in the procedure mentioned below are performed based on control instructions from a computing unit 101 of a server 100 to be described later with reference to FIG. 4 to FIG. 7. In other words, the computing unit 101 functions as a "computer" in the program according to the invention disclosed herein, and as a "control unit" in a control method for a game system according to the invention. Further, various storage media with game information recorded thereon in addition to a ROM 102, a RAM 103, and an external memory 106 to be described later as well correspond to an "information storage unit" in the program and the game system control method according to the invention.

As shown in FIG. 1, processing is started at step SP0, and various settings are first performed (step SP10). The various settings include the setting of a "personality" to each of multiple character cards, such as a preference for food, goods, or a hobby (such as liking/disliking or strong/weak points) (step SP11), the setting of characteristic parameters to each character card (step SP12), and the setting of item characteristic parameters (step SP13).

In step SP12, the "degree of intimacy" between a player and the character card (as the above-mentioned characteristic parameter of the first game content) is set as one of the characteristic parameters for the character card, for example, as a numerical parameter (e.g., in a range between a minimum value of 0% to a maximum value of 100%). In step SP13, a "level" of the "personality" associated with the character card is also set as one of the item characteristic parameters. More specifically, when items are various kinds of food as exemplified above, love, like, dislike, hate, and neutral are set as the "levels" of preferences for these kinds of food.

Here, FIGS. 2A to 2D are schematic views showing examples of foods in a state where these items are displayed on a screen 2a of a terminal device 2 operated by a player. In these examples, item A1 is apple, item A2 is melon, item A3 is banana, and item A4 is peach. Further, in these items A1 to A4, the following is set as the "levels" of preferences ("personalities") for food on character card C1 among multiple character cards owned by the player, namely: "like" to apple, "love" to melon, "dislike" to banana, and "hate" to peach. The details of the states shown in FIGS. 2A to 2D will be described later.

Returning to FIG. 1, after completion of the various settings (step SP10), the player can synthesize desired items (here, the items A1 to A4 shown in FIG. 2) with the character card C1 at appropriate timing to strengthen or evolve the player character (enhanced synthesis or evolutionary synthesis). Thus, the player selects the items A1 to A4 to be synthesized with the character card C1 (step SP20).

The items A1 to A4 selected by the player are synthesized with the character card C1 sequentially (step SP30). At this time, the above-mentioned "levels" set to the items A1 to A4 are first determined (step SP31), and based on the "levels," calculations to change the initial value of the "degree of intimacy" of the character card C1 are performed, and the results are displayed on the screen 2a of the terminal device 2 (step SP32). The "levels" related to the preferences of the character card C1 and set to these items A1 to A4, and the rate of change of the "degree of intimacy" of the character card (percentage: the increase-decrease rate from the initial value) are set, for example, as shown in an information setting table (master table) represented by Table 1 mentioned below (this setting can also be performed as part of the various settings in step SP10 mentioned above). This information setting table is stored in the ROM 102, the RAM 103, the external memory 106, or the like as the information storage unit in a manner to be able to be read and written by the computing unit 101 of the server 100 (the same applies to other information setting tables).

TABLE 1

| ITEM | LEVEL | RATE OF CHANGE OF INTIMACY DEGREE |
|---|---|---|
| ITEM A1 (APPLE) | LIKE | +50% (UP) |
| ITEM A2 (MELON) | LOVE | +95% (DRASTICALLY UP) |
| ITEM A3 (BANANA) | DISLIKE | −40% (DOWN) |
| ITEM A4 (PEACH) | HATE | −90% (DRASTICALLY DOWN) |

FIGS. 2A to 2D are also examples of rendition when the character card C1 and each of the items A1 to A4 are synthesized, respectively, showing states after the "degree of intimacy" of the character card C1 is changed. Note that the "rendition" when a character card and an item are synthesized denotes the overall effect recognizable to the player in terms of the synthesis of both, including the effect of a moving image or a still image displayed on the terminal device 2, sound output from the terminal device 2, music, and sound effects. For example, in FIG. 2A, an illustration or a photographic image of apple indicative of the selected item A1 is displayed in the central part of the screen 2a of the terminal device 2, and a gauge 31 visually showing the calculation result of the "degree of intimacy" is displayed in an area above the apple as shown. The gauge 31 uses the proportion of a shaded area to the overall width of the gauge to indicate a state of +50% of the "degree of intimacy" from the initial value as shown in Table 1. Heart-shaped FIG. 41 are also displayed in FIG. 2A as a rendition effect that makes it easier to visually recognize the fact that the "level" of the item A1 with respect to the preference of the character card C1 is "like" and the degree of intimacy is increased by 50%. Thus, both the gauge 31 and the FIG. 41 are part of "rendition" (especially screen rendition) when the character card and the item are synthesized.

Figure 2B:
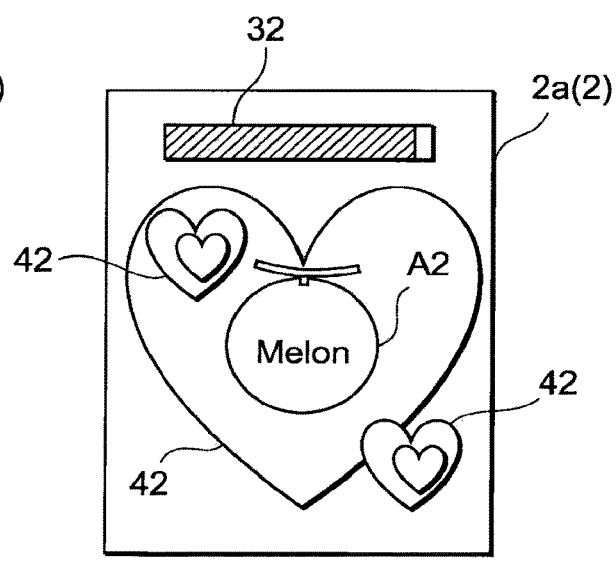
Figure 2C:
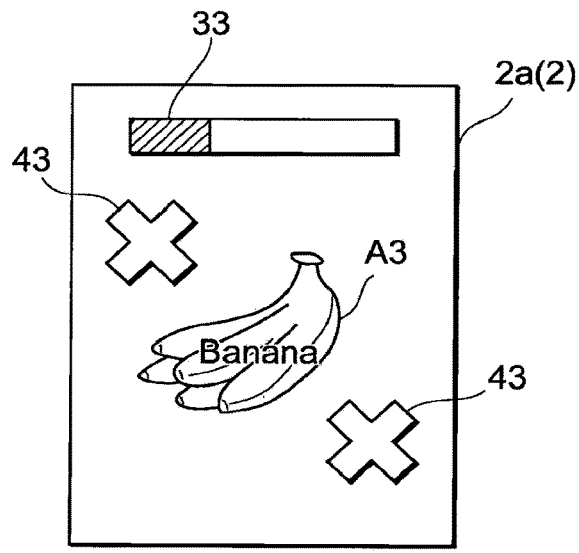
Figure 2D:
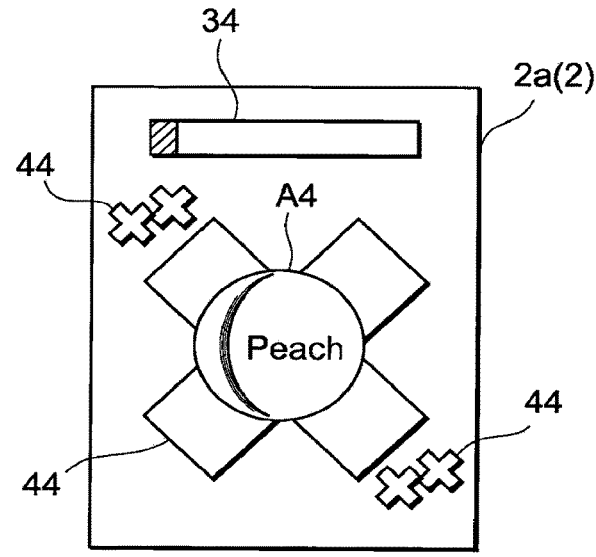

Similarly, in FIG. 2B, an illustration or a photographic image of melon indicative of the item A2, a gauge 32 indicative of the calculation result of the "degree of intimacy" (a state of +95% of the "degree of intimacy" from the initial value), and heart-shaped figures (including a larger heart-shaped figure) different from the heart-shaped FIG. 41 and indicating that the "level" of the item A2 is "love" and the "degree of intimacy" is increased by 95% are displayed. On the other hand, in FIG. 2C, an illustration or a photographic image of banana indicative of the item A3, a gauge 33 indicative of the calculation result of the "degree of intimacy" (a state of −40% of the "degree of intimacy" from the initial value), and cross mark FIG. 43 indicating that the "level" of the item A3 is "dislike" and the "degree of intimacy" is decreased by 40° are displayed. Further, in FIG. 2D, an illustration or a photographic image of peach indicative of the item A4, a gauge 34 indicative of the calculation result of the "degree of intimacy" (a state of −90% of the "degree of intimacy" from the initial value), and different cross mark FIG. 44 (including a larger cross mark figure) indicating that the "level" of the item A4 is "hate" and the "degree of intimacy" is decreased by 90% are displayed.

Thus, since the synthesized cards are displayed in forms different from one another according to the items A1 to A4, the visibility, distinctiveness, and selectivity of each of the items A1 to A4 can be improved. This can also make it easier to observationally contemplate or recall the kinds of fruit of the items A1 to A4 as shown in FIG. 2, adding further reality to the game and contributing to increasing the interest in the game as well.

In the meantime, it is set that the player cannot directly acquire the "levels" set for these items A1 to A4 and shown in Table 1. In other words, information on to what extent the player character of the character card C1 likes or dislike each of the items A1 to A4 is concealed from the player. Therefore, the player can infer the "levels" set for the items A1 to A4 only after visually recognizing the game screens shown in FIGS. 2A to 2D as rendition images of the synthesis results of the character card C1 and the items A1 to A4. In other words, based on the illustrations or the like representing the items A1 to A4, and the gauges 31 to 34 and the FIGS. 41 to 44 representing the calculation results of the "degrees of intimacy," the player can appreciate information as to whether the character card C1 likes or loves, or dislikes or hates each of the items A1 to A4. Thus, the calculation results of the "degrees of intimacy" are displayed in forms different for each of the items A1 to A4, and this makes it easier for the player to determine the results of changes in the "degree of intimacy," and further enhances the visual effects as game screens, enabling further improvement of the interest in the game.

Note that FIGS. 2A to 2D show the states when each of the items A1 to A4 is combined individually with the character card C1 to synthesize both, i.e., the results of changes in the "degree of intimacy" from the initial value as mentioned above. However, when these multiple items A1 to A4 are combined with the character card C1 sequentially to synthesize all, the change in the "degree of intimacy" can be set as a cumulative value of these change rates. In other words, when the character card C1 and the items A1 to A4 are synthesized at a time, the calculation result of the "degree of intimacy" in the example shown in Table 1 is obtained by accumulating the rates of change of these "degrees of intimacy" (+50%+95%−40%−90%=+15%), and based on the result, +15% of the initial value can be calculated.

Returning to FIG. 1 again, upon completion of the synthesis of the character card C1 and the items A1 to A4, and the calculation and result display of the "degree of intimacy" of the character card C1, it is determined whether the calculated "degree of intimacy" is greater than or equal to the maximum value Smax (step SP40). Note that this maximum value Smax can also be set in step SP10, where the various settings are performed. When the "degree of intimacy" is greater than or equal to the maximum value Smax (when Yes in step SP40), the character card C1 exhibits a predetermined effect (step SP50).

For example, in the case of the enhanced synthesis of the character card C1, a special skill preset to the character card C1 as a latent ability is made exercisable (so-called skill release). Alternatively, a special skill as a newly imparted ability rather than that potentially set to the character card C1 may be made exercisable. In the case of the evolutionary synthesis of the character card C1, such a form that the numeric value of the attack power or defense power of the player character of the character card C1 is increased by an amount much larger than that imparted by performing a common game can be exemplified.

More specifically, when the initial value (default) of the "degree of intimacy" is +20% and Smax thereof is set to +100%, since the calculation result of the "degree of intimacy" when the character card C1 and the items A1 to A4 are synthesized at a time as mentioned above (+20% (default)+15%=+35% because of +15% of the initial value as the cumulative value) is less than Smax, No is determined in step SP40. In this case, the skill release or the evolution of the character card C1 cannot be performed. However, if only the items A1 and A2 are synthesized with the character card C1 in step SP30, since the calculation result of the "degree of intimacy" will be +20% (default)+50% (item A1)+95% (item A2)=+165% (see Table 1), Yes is determined in step SP40 to enable the skill release or the evolution of the character card C1.

Even when the items A1 to A4 are all synthesized, it is assumed that, if the "degree of intimacy" is calculated for each item and the determination in step SP40 is made appropriately, the calculated value of the "degree of intimacy" may exceed the Smax in the middle of the synthesis processing depending on the order of synthesis of the items. For example, when the character card C1 is synthesized with the items in order of item A3, item A1, and item A2, the calculation result of the "degree of intimacy" in the synthesis step of the item A2 becomes +20% (default)−40% (item A3)+50% (item A1)+95° (item A2)=+105% (see Table 1), exceeding the Smax (+100%) in the step. If the synthesis processing is stopped at the time (for example, without further synthesis of the item A4) and step SP40 is executed in this state, the determination result will be Yes, enabling the skill release or the evolution of the character card C1.

On the other hand, when the "degree of intimacy" of the character card C1 after being subjected to synthesis and calculation is less than the maximum value Smax (when No in step SP40), the character card C1 cannot exhibit the predetermined effect. After passing through steps SP40 and SP50, the player may finish the synthesis processing or the game itself in step SP1, or may move into any event other than the synthesis.

Figure 3:
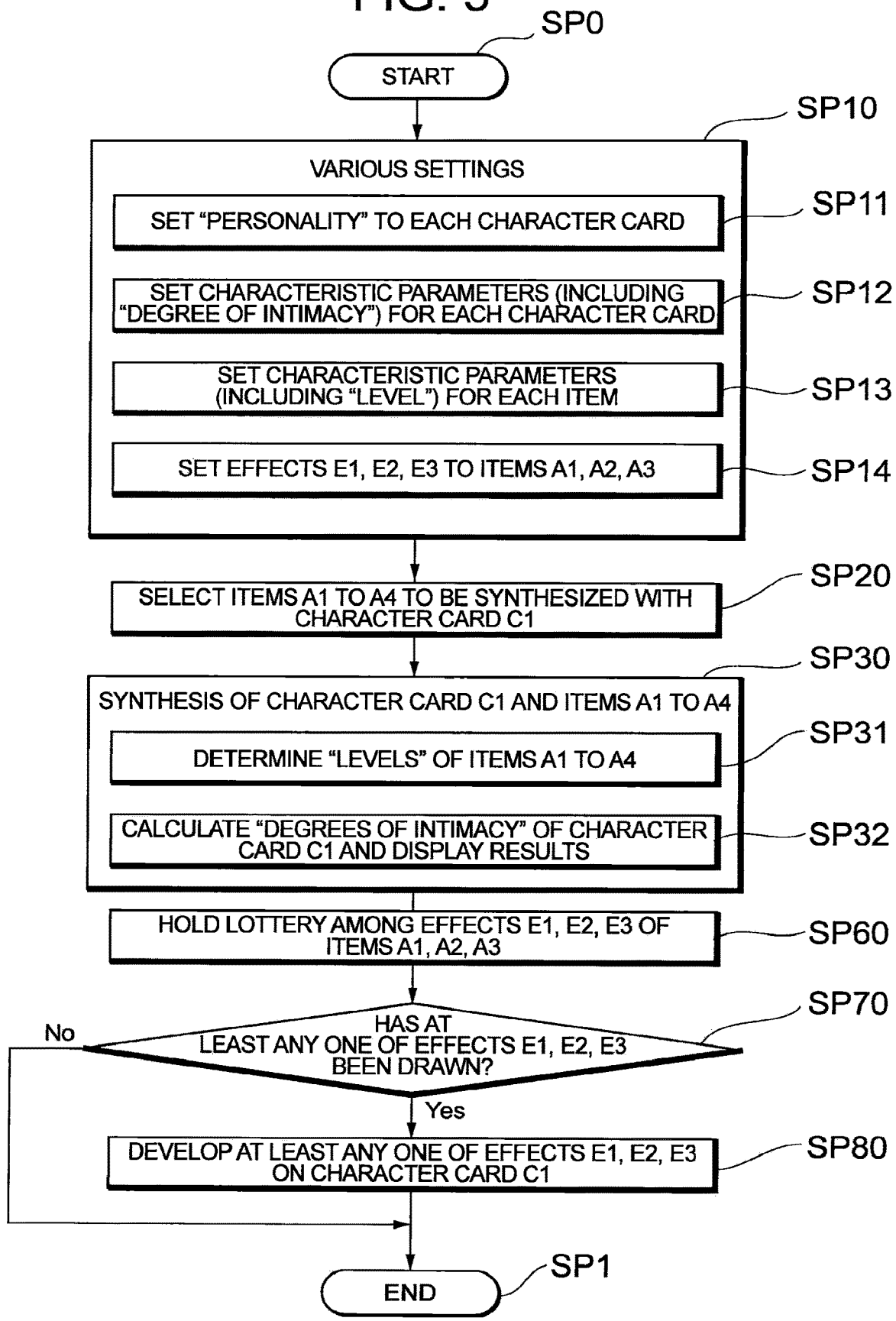
FIG. 3 is a schematic flowchart showing part of a processing procedure in a game performed by another preferred embodiment of the program.

FIG. 3 is a schematic flowchart showing part of a processing procedure in a game performed by another preferred embodiment of the program according to the invention disclosed herein. This procedure in the second embodiment is the same as the procedure in the first embodiment shown in FIG. 1 except in that step SP14 is added and executed in the various setting step SP10, and steps SP60, SP70, and SP80 are executed instead of steps SP40 and SP50.

In other words, in the various setting step SP10 of the embodiment, effects E1, E2, and E3 (specific effects) are set to the items A1, A2, and A3, respectively (step SP14), in addition to the execution of the "personality" setting step SP11, the "degree of intimacy" setting step SP12, and the "level" setting step SP13 mentioned above. The contents of these effects E1, E2, and E3 are not particularly limited. For example, the effects may be so set that the defense power of the character card C1 is put up by +3000 as the effect E1 of the item A1, the attack power of the character card C1 is increased by 1.5 times as the effect E2 of the item A2, and 100 chips usable in the game are given to the player as the effect E3 of the item A3. Alternatively, such an effect that the player character of the character card C1 can exercise a special skill may be set.

Then, like in the first embodiment, the items A1 to A4 are selected as items to be synthesized (step SP20), the "degrees of intimacy" are calculated based on the "levels" set for the items (steps SP31 and SP32) in the synthesis of these items with the character card C1 (step SP30). Next, unlike in the first embodiment, a lottery to determine which of the effects E1, E2, and E3 respectively set to the items A1, A2, and A3 is exhibited is held (step SP60).

Here, an appearance probability unique to each of the effects is also set in addition to the setting of the effects E1, E2, and E3 to the items A1, A2, and A3 (such a setting can also be performed in the various setting step SP10). An example of the information setting table is shown in Table 2 below.

TABLE 2

| ITEM | EFFECT | APPEARANCE PROBABILITY (WEIGHT) |
|---|---|---|
| ITEM A1 (APPLE) | E1 (DEFENSE POWER +3000) | 100 (0.1%) |
| ITEM A2 (MELON) | E2 (1.5 TIMES OF ATTACK POWER) | 2000 (2%) |
| ITEM A3 (BANANA) | E3 (100 CHIPS) | 15000 (15%) |
| ITEM A4 (PEACH) | NONE | NONE |

Then, the lottery in step SP60 is held based not only on the appearance probability set to each of the effects E1, E2, and E3 of the items A1, A2, and A3, but also on the "degree of intimacy" calculated by synthesizing the character card C1 and each of the items A1 to A4. For example, the winning rate of each of the effects E1, E2, and E3 is calculated as the appearance probability x the degree of intimacy x an adjustment factor R. As a more specific example, the winning rate of each of the effects E1, E2, and E3 in the lottery when the adjustment factor R=5.0 in the above example of the calculation result of the "degree of intimacy" (+35%) is shown in Table 3 below.

TABLE 3

| ITEM | EFFECT | APPEARANCE PROBABILITY | DEGREE OF INTIMACY | R | WINNING RATE |
|---|---|---|---|---|---|
| ITEM A1 (APPLE) | E1 | 0.1% | +35% | 5.0 | 1.5% |
| ITEM A2 (MELON) | E2 | 2% | | | 3.5% |
| ITEM A3 (BANANA) | E3 | 14% | | | 24.5% |
| ITEM A4 (PEACH) | NONE | NONE | | | NONE |

Thus, the winning rate calculated based on the "appearance probability" and the "degree of intimacy" is used to hold a lottery for each of the effects E1, E2, and E3 of the items A1, A2, and A3 and to determine whether at least any one of the effects E1, E2, and E3 has been drawn (step SP70). When any of the effects E1, E2, and E3 has been drawn (when Yes in step SP70), the effect is exhibited on the character card C1. On the other hand, when none of the effects E1, E2, and E3 have been drawn (when No in step SP70), the player may finish the synthesis processing or the game itself in step SP1, or may move into any event other than the synthesis.

Figure 4:
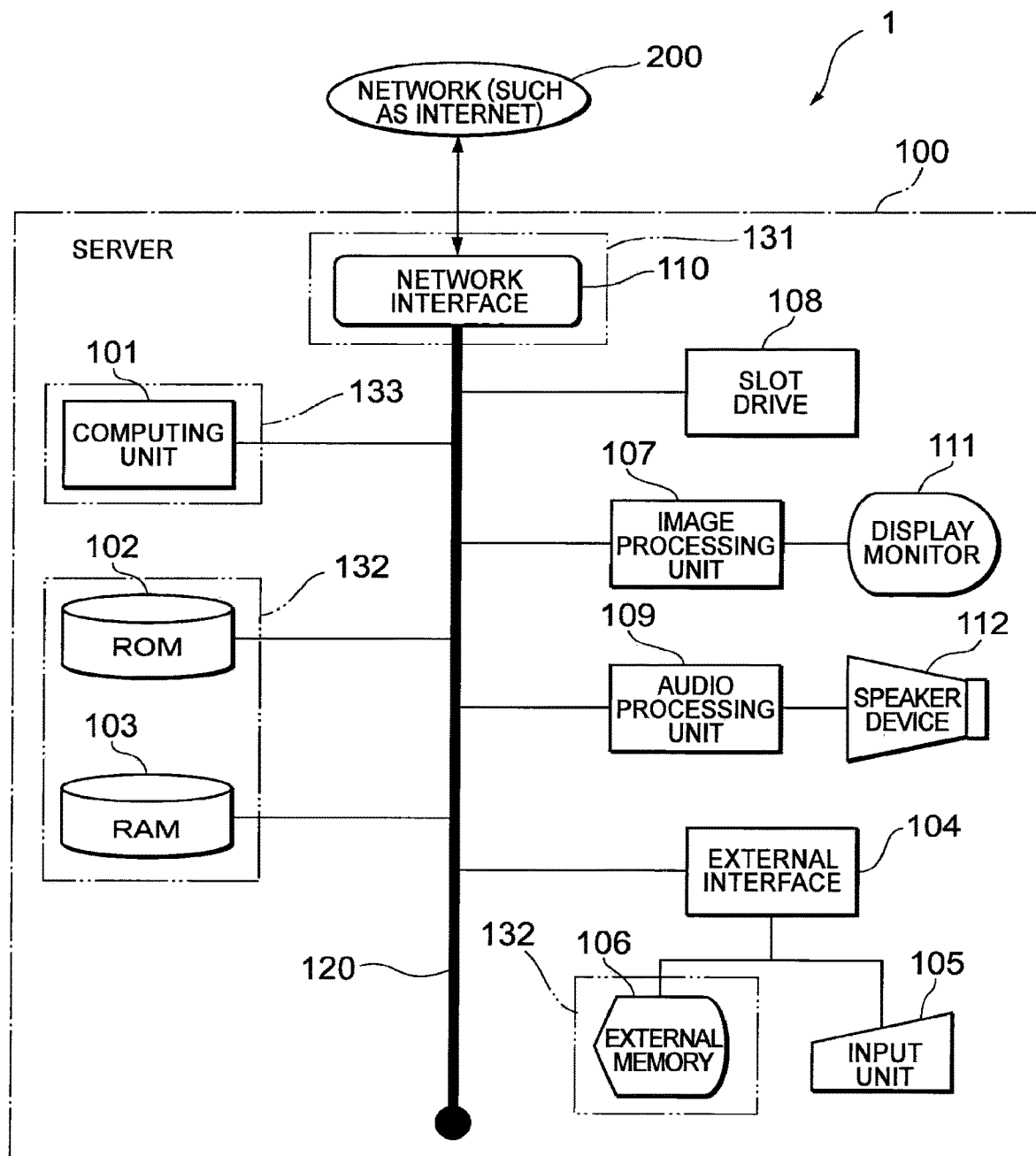
FIG. 4 is a schematic block diagram (system block diagram) showing one preferred embodiment of a game system comprising a server as a computer useful to run the program.
Figure 5:
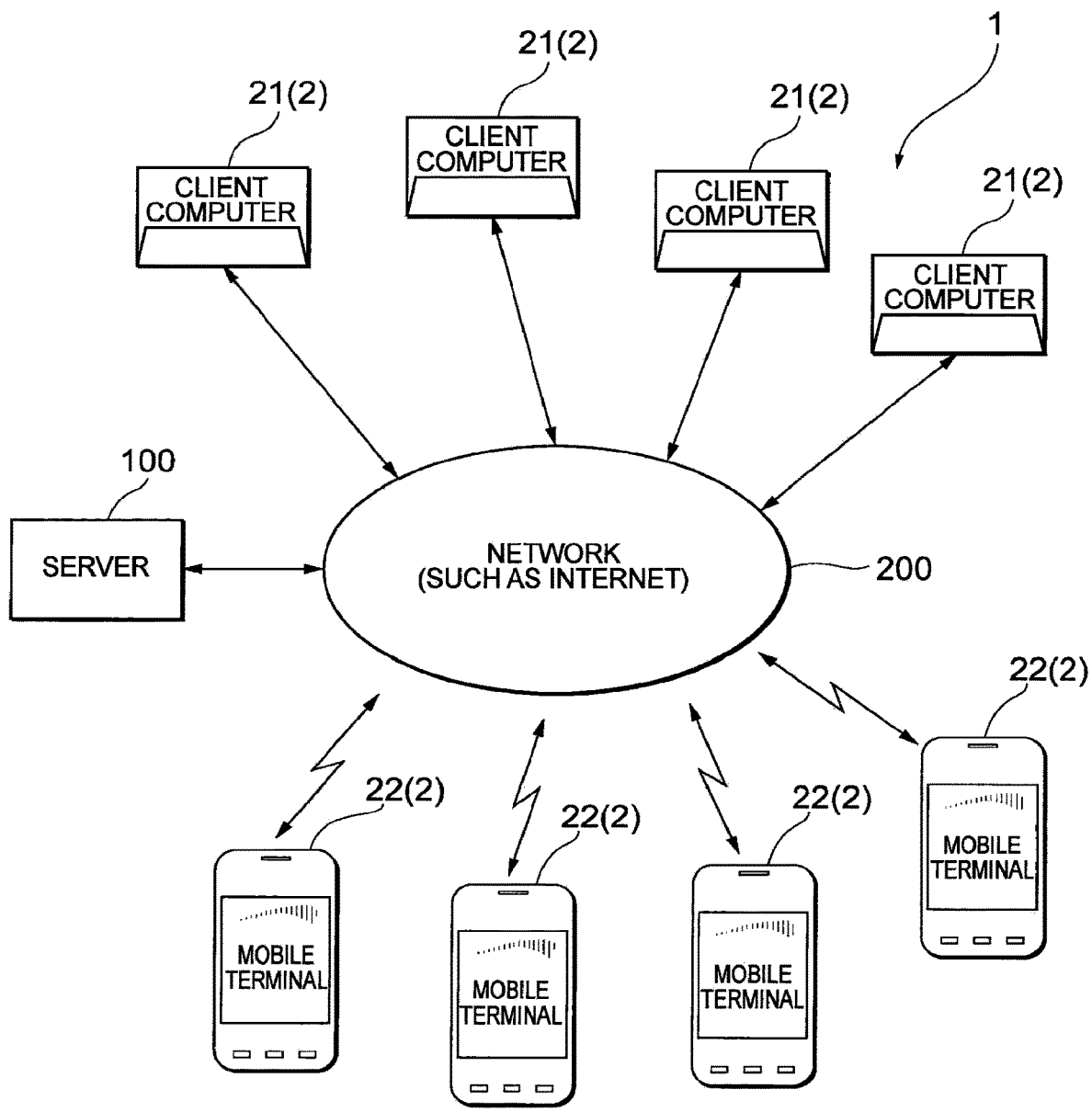
FIG. 5 is a schematic block diagram (system configuration diagram) showing the one preferred embodiment of the game system comprising the server as the computer useful to run the program.
Figure 6:
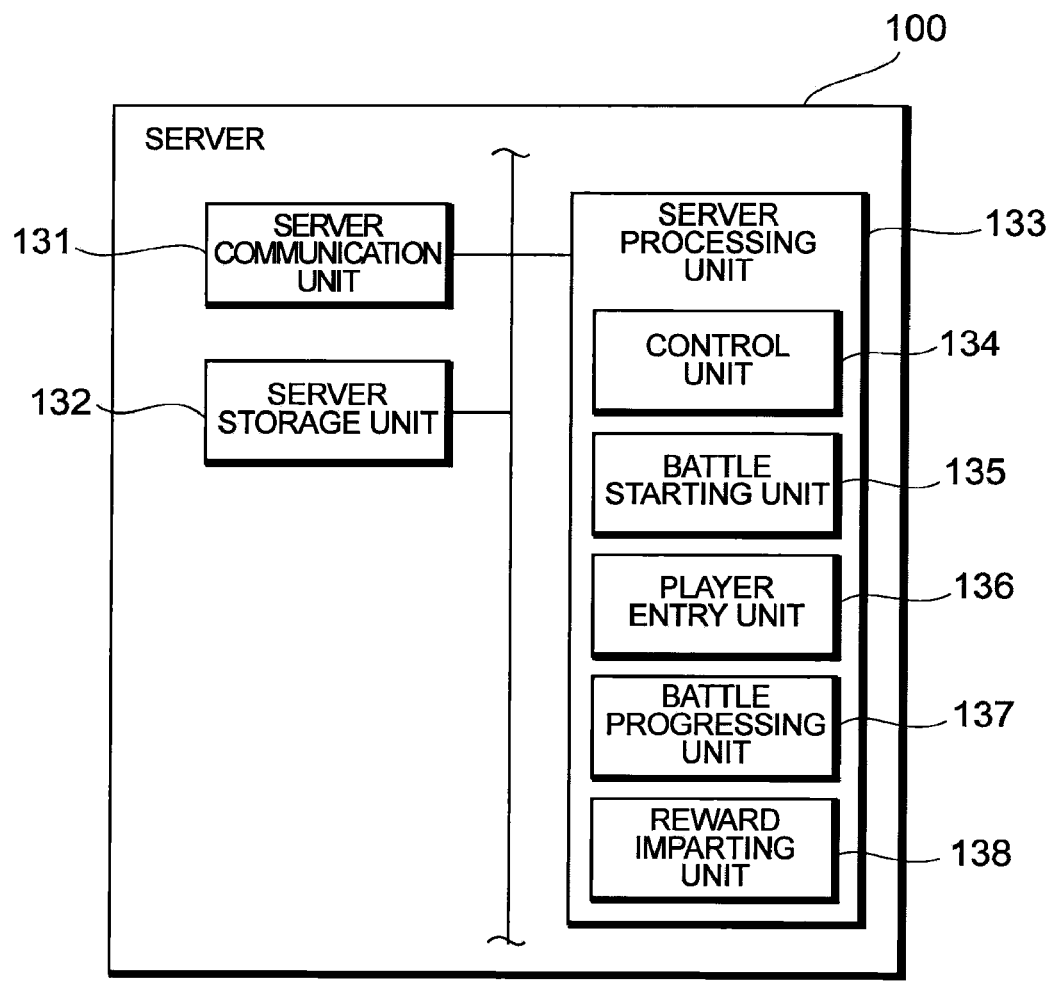
FIG. 6 is a schematic block diagram (functional block diagram) of the server shown in FIG. 4 and FIG. 5.

FIG. 4 and FIG. 5 are schematic block diagrams (a system block diagram and a system configuration diagram) showing one preferred embodiment of a game system comprising a server as a computer useful to run a program according to the invention. As shown in these figures, a server 100 included in the game system 1 is a server computer connected to a network 200, and a predetermined server program is run on the server computer to fulfill a server function. Further, the server 100 and terminal devices 2 such as client computers 21 and mobile terminals 22, connected by wire and/or wireless to the network 200, are set up to be communicable with one another to configure a game system 1. Note that the server 100 itself is an example of the game system according to the invention disclosed herein.

The network 200 is, for example, a communication line or a communication network relating to information processing such as the Internet, and a specific structure thereof is not particularly limited as long as the network 200 enables the exchange of data between the server 100 and the terminal devices 2. For example, the network 200 may comprise a base station wirelessly connected to the terminal devices 2, a mobile communication network connected to the base station, the Internet connected to the server, and a gateway device for connecting the mobile communication network and the Internet.

The server 100 is configured such that the computing unit 101 such as a CPU or an MPU, the ROM 102 and the RAM 103 as storage devices, an external interface 104 to which an input unit 105 and an external memory 106 are connected, an image processing unit 107 to which a display monitor 111 is connected, a slot drive 108 into or to which a disk or a memory device is loaded or connected, an audio processing unit 109 to which a speaker device 112 is connected, and a network interface 110 are connected to one another through a transmission path 120 such as a system bus, for example, an internal bus, an external bus, and an expansion bus. Note that devices responsible for input/output of the input unit 105, the external memory 106, the display monitor 111, and the speaker device 112 may be omitted appropriately as needed, or even when these devices are included, they may not always be connected to the transmission path 120.

The computing unit 101 comprises one or more processors and peripheral circuits thereof, and controls the entire operation of the server 100 not only to exchange control signals and information signals (data) with the other components mentioned above, but also to perform various arithmetic processing necessary to execute a game. Therefore, the computing unit 101 is configured to be able to perform, on a fast-accessible storage area such as a so-called register, arithmetic operations such as addition, subtraction, multiplication and division using an arithmetic logical unit or the like, logical operations such as logical OR, logical AND, and logical NOT, bitwise operations such as bitwise OR, bitwise AND, bitwise invert, bitwise shift, and bitwise rotate, and if desired, a saturation calculation, a trigonometric function calculation, a vector operation, and the like. The computing unit 101 can run two or more programs in parallel.

An IPL (Initial Program Loader) first executed after power-on is generally recorded in the ROM 102. This IPL is executed so that the computing unit 101 will read various programs and various data once into the RAM 103 to execute the programs, where the programs are recorded on the disk or in the memory device loaded in or connected to the slot drive 108. An operating system program necessary to control the entire operation of the server 100, various application programs (including driver programs, a server program, and a game program), and various data (such as data necessary for the progress of the game and communication between two or more terminal devices 2) may also be recorded in the ROM 102.

The RAM 103 is to store programs and data temporarily, holding the various programs and various data read by the computing unit 101 as mentioned above. The operating system program, the various application programs (including the driver programs, the server program, and the game program), and the various data mentioned above may be recorded in the RAM 103. The computing unit 101 sets a variable area in the RAM 103 to perform direct operations using the arithmetic logical unit on values stored in the variable area as well, or once copies or moves the values stored in the RAM 103 to the register to perform direct operations on the register and further perform processing for writing these operation results back to the RAM 103.

The input unit 105 connected through the external interface 104 is to accept various operations input from a user (SNS provider or game provider) of the server 100. As the input unit 105, a voice input unit can be employed as well as a keyboard, a touch pad, and a touch panel. The kind of device as the input unit 105 is not particularly limited as long as the device can input instructions, such as various operations, a confirmation operation, a cancel operation, and the display of a menu.

Rewritably stored in the RAM 103 and the external memory 106, removably connected through the external interface 104, are data indicative of the operating conditions of the server 100, the access status of each terminal device 2, and the game playing conditions and the stages of progress (the results in the past, and the like) on each terminal device 2, log (record) data on communication between terminal devices 2, and the like. The external memory 106 can, for example, be a flash memory, a magnetic disk unit, an optical disk unit, or a magnetic tape unit.

The image processing unit 107 processes the various data read from the slot drive 108 by the computing unit 101 or by itself, and records processed image information in a frame memory or the like. The image information recorded in this frame memory is converted to a video signal at predetermined synchronization timing, and output to the display monitor 111 connected to the image processing unit 107. This enables various images to be displayed. Further, in cooperation with the computing unit 101, image information on a game is sent from the image processing unit 107 and/or the computing unit 101 to each terminal device 2.

The audio processing unit 109 converts the various data read from the slot drive 108 into audio signals, and outputs the audio signals from the speaker device 112 connected to the audio processing unit 109. Further, in cooperation with the computing unit 101, audio information on the game (sound effects and music information) is sent from the audio processing unit 109 and/or the computing unit 101 to each terminal device 2.

The network interface 110 is configured to comprise the server 100 to the network 200. The network interface 110 is configured to comprise, for example, an analog modem, an ISDN modem, or an ADSL modem, which conforms to each standard used in establishing a LAN, a cable modem for connection to the Internet using a cable TV line, and the like, and an interface (communication interface circuit) for connecting these to the computing unit 101 through the transmission path 120.

The hardware configuration of the server 100 is as mentioned above, and FIG. 6 is a schematic block diagram (functional block diagram) showing the server 100 shown in FIG. 4 and FIG. 5 from a functional perspective. The server 100 is to make a game progress in response to a player's request from a terminal device 2, comprising at least a server communication unit 131, a server storage unit 132, and a server processing unit 133 as functions for making the game progress.

The server communication unit 131 is to perform communication between the server 100 and the network 200, having a function of supplying data received from a terminal device 2 or the like to the server processing unit 133, and transmitting data supplied from the server processing unit 133 to the terminal device 2. Specifically, this server communication unit 131 is configured to comprise at least the above-mentioned network interface 110 shown in FIG. 4.

The server storage unit 132 is to store various programs and various data. Specifically, the server storage unit 132 is configured to comprise at least any one of the ROM 102, the RAM 103, and the external memory 106 shown in FIG. 4 and mentioned above. Here, a game program stored in the server storage unit 132 is a game application program for performing the procedure in the first embodiment shown in FIG. 1 and the procedure in the second embodiment shown in FIG. 3, and display data on the game and data on various calculation results are recorded in the server storage unit 132.

Further, the server storage unit 132 may temporarily store temporary data on predetermined arithmetic processing in the server processing unit 133 as well as a player management table for managing players, a game content management table (in which information setting tables of Table 1 to Table 3 mentioned above are included, for example) for managing game content such as character cards and items, a group management table for managing groups if there is any group to which players belong, a battle event management table for managing battle events as required, and an enemy management table for managing characters such as enemy characters other than player characters as required. Note that these management tables are associated with one another by player IDs or the like as required.

Further, taking a game including a battle event as an example, the server processing unit 133 is constructed from the computing unit 101 shown in FIG. 4, comprising, as functional modules, a control unit 134, a battle starting unit 135, a player entry unit 136, a battle progressing unit 137, and a reward imparting unit 138. Each of these units (functional modules) may be implemented by the above-mentioned various programs executed by a processor of the computing unit 101, or mounted as firmware in the computing unit 101.

Figure 7:
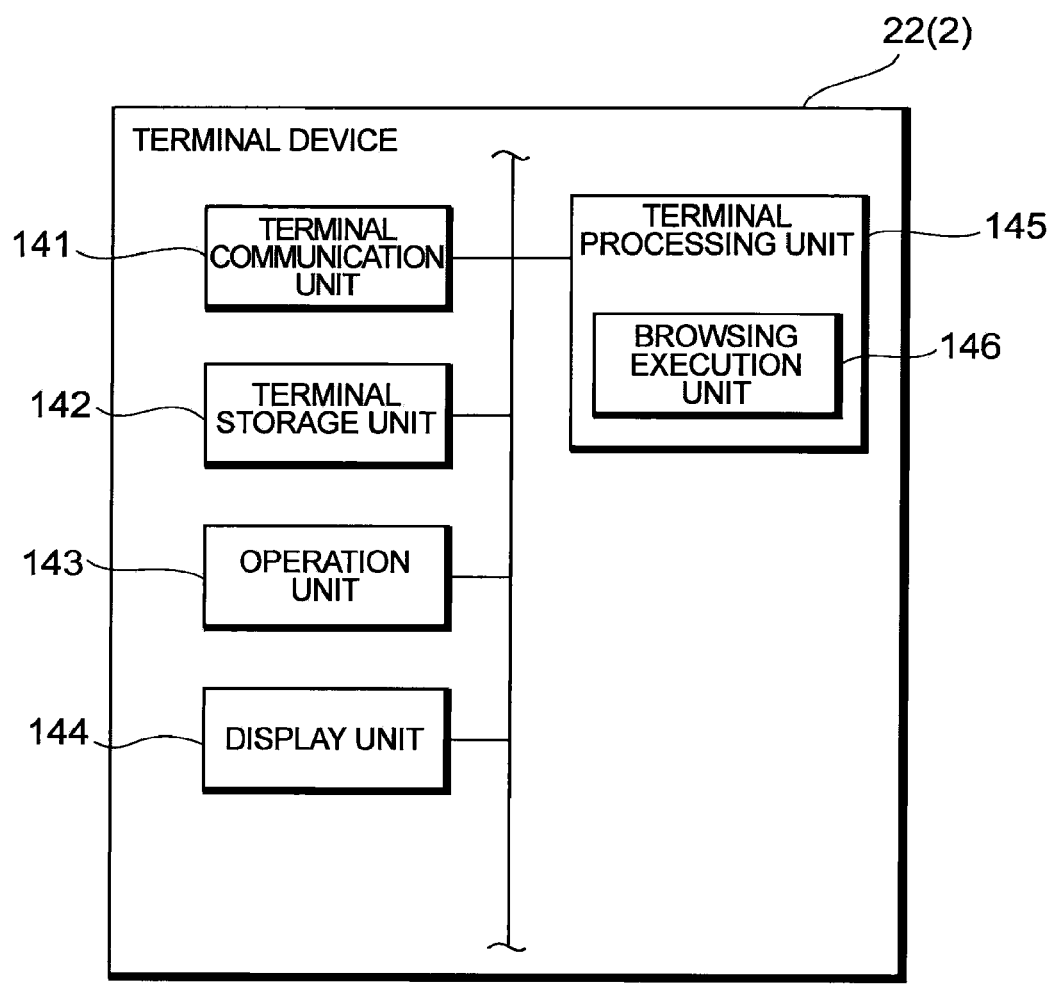
FIG. 7 is a schematic block diagram (functional block diagram) of a terminal device shown in FIG. 5.

FIG. 7 is a schematic block diagram of a terminal device 2 shown in FIG. 5, which is also a functional block diagram including a functional perspective. For example, the terminal device 2 is a mobile terminal 22 as mentioned above, and a multifunctional mobile phone (so-called "smartphone"), a cellular phone (so-called "feature phone"), a personal digital assistant (PDA), a portable game machine, a portable music player, and a tablet PC are cited as the mobile terminal 22. Such a terminal device 2 comprises a terminal communication unit 141, a terminal storage unit 142, an operation unit 143, a display unit 144, and a terminal processing unit 145.

The terminal communication unit 141 is provided with a communication interface circuit comprising an antenna with a predetermined frequency band as its sensitive band to connect the terminal device 2 to the network 200 through a radio communication network. The communication mode in this case is not particularly limited. For example, a radio signal line is established by a WCDMA (registered trademark) (Wideband Code Division Multiple Access) with a base station for the communication through a channel assigned by the base station to perform communication with the base station. Then, the terminal communication unit 141 transmits data supplied from the terminal processing unit 145 to the server 100, and supplies data received from the server 100 to the terminal processing unit 145.

The terminal storage unit 142 comprises, for example, at least one of a flash memory, a magnetic disk unit, and an optical disk unit to store an operating system program, driver programs, application programs, and data used for processing in the terminal processing unit 145. Among them, for example, the driver programs comprise an input device driver program for controlling the operation unit 143, and an output device driver program for controlling the display unit 144. Programs for acquiring and displaying image display data related to the progress of a game can be exemplified as the application programs. The data comprises display data related to the progress of the game, video data, image data, and the like. Note that the terminal storage unit 142 may temporarily store temporal data related to predetermined processing.

The operation unit 143 may be any device as long as it makes the terminal device 2 operable and the player can enter characters, numbers, and the like. For example, a touch panel, a touch-pad, and a keyboard are cited as the operation unit 143. When the operation unit 143 is operated by the player, the operation unit 143 generates a signal corresponding to the operation, and supplies the signal to the terminal processing unit 145. The terminal device 2 transmits the operation signal generated by the player to the server 100 through the terminal communication unit 141 to request an operation necessary for the progress of the game.

The display unit 144 is to display video corresponding to video data and images corresponding to image data supplied from the terminal processing unit 145, where the video and the images constitute the main part of the screen 2a of the terminal device 2 to be described later. The display unit 144 may be any device as long as it can display text, video, images, and the like, such as a liquid crystal display or an organic EL (Electro-Luminescence) display.

The terminal processing unit 145 comprises one or more processors such as a CPU and an MPU, and peripheral circuits thereof to perform centralized control of the entire operation of the terminal device 2. For example, a unit having a structure equivalent to that of the computing unit 101 of the server 100 mentioned above can be exemplified. The terminal processing unit 145 further controls the operation of the terminal communication unit 141, the display unit 144, and the like so that various kinds of processing on the terminal device 2 will be performed along the programs (such as the operating system program, the driver programs, and the application programs) stored in the terminal storage unit 142 in an appropriate procedure according to the operations of the operation unit 143 and the like.

This terminal processing unit 145 comprises at least a browsing execution unit 146 implemented by the above-mentioned various programs or as a functional module mounted in the terminal device 2 as the firmware. This browsing execution unit 146 acquires display data related to the progress of the game mentioned above, and provides the display thereof. In other words, the browsing execution unit 146 transmits an acquisition request for the display data related to the progress of the game to the server 100 through the terminal communication unit 141 in accordance with an instruction from the player, and receives corresponding display data from the server 100 through the terminal communication unit 141. Further, the browsing execution unit 146 creates drawing data based on the display data received. In other words, the browsing execution unit 146 analyzes the received display data to specify control data and content data, lays out the specified content data according to the specified control data to reconfigure the drawing data, and outputs the drawing data to the display unit 144.

Here, for example, the outline of an operation sequence in the game system 1 is as follows, namely: When the player instructs the terminal device 2 through the operation unit 143 of the terminal device 2 to execute a program, the terminal device 2 starts processing based on the program, and the terminal processing unit 145 implemented by the program transmits an acquisition request, for example, for a game introduction screen, to the server 100 through the terminal communication unit 141 of the terminal device 2. In the server 100 that received the acquisition request, the control unit 134 of the server processing unit 133 creates display data for displaying the introduction screen. Then, the control unit 134 transmits the created display data to the terminal device 2 through the server communication unit 131. The terminal processing unit 145 that received the display data through the terminal communication unit 141 creates drawing data based on the display data, and outputs the drawing data to the display unit 144 of the terminal device 2 to display the game introduction screen.

When participation in the game is instructed on the game introduction screen by the player through the operation unit 143 of the terminal device 2, the terminal processing unit 145 transmits an acquisition request for another game screen (for example, a screen including a menu for enhanced synthesis or evolutionary synthesis between the character card C1 and items) to the server 100 through the terminal communication unit 141. In the server 100 that received the acquisition request, the control unit 134 of the server processing unit 133 creates display data for displaying the game screen. Then, the control unit 134 transmits the created display data to the terminal device 2 through the server communication unit 131. The terminal processing unit 145 that received the display data through the terminal communication unit 141 creates drawing data based on the display data, and outputs the drawing data to the display unit 144 of the terminal device 2 to display the game screen.

When the player selects the implementation of enhanced synthesis or evolutionary synthesis of the character card C1 on this game screen, the terminal processing unit 145 transmits an acquisition request for a screen for selecting items (the items A1 to A4 in the above example) to be synthesized with the character card C1 to the server 100 through the terminal communication unit 141. In the server 100 that received the acquisition request, the control unit 134 of the server processing unit 133 creates display data for the screen, and the terminal processing unit 145 of the terminal device 2 that received the display data displays a list of items owned by the player on the display unit 144, for example, in a manner to be selectable by the player. Then, each of the above-mentioned processing steps is executed to perform the enhanced synthesis or the evolutionary synthesis of the character card C1.

According to the game program, the game system 1, and the control method configured as mentioned above, a "personality" is provided for a character card (first game content) owned by the player, such as a preference for food, goods, or a hobby (liking/disliking or strong/weak points), and "levels" associated with the "personality" of the character card are set as characteristic parameters for the items A1 to A4 (second game contents) to be synthesized with the character card to enable the enhancement or the evolution of the player character. Then, these are combined and synthesized so that the "degree of intimacy" with the player separately set as a characteristic parameter for the character card can be changed according to the "levels" as the characteristics of the items A1 to A4.

As a result, the "degree of intimacy" of each character card is made different, such as the case where the "degree of intimacy" of a specific character card among the character cards owned by the player is increased, whereas the "degrees of intimacy" of the other character cards are relatively decreased, and this may increase attachment to a character card higher in the "degree of intimacy," or create a desire to further enhance the "degree of intimacy" of a favorite character card. Therefore, differences in the degree of ties between respective character cards and the player are generated, so that variation in the usage of character cards and the game development for increasing the "degree of intimacy" can be increased. Thus, new values can be added to the character cards owned by the player in a relationship with the player. As a result, an unpredictable quality can be given to the game to drastically improve the fun of and interest in the game compared with the conventional. Further, player's interest in the game and motivation to continue the game can be raised.

Since the "levels" set for the items A1 to A4 as shown in Table 1 are concealed from the player, the player cannot directly recognize the "levels" literally, but the player can check on the game screen shown in FIGS. 2A to 2D indicative of the results of synthesis between the character card C1 and the items A1 to A4 to infer the levels" of the items A1 to A4. Thus, the player collects and learns pieces of information on the "levels" of the items A1 to A4, and makes use thereof for the next play so that the player can make the game progress advantageously or further increase variation in the game development. In this regard, the unpredictable quality of and interest in the game that are not present in conventional games can be realized, and hence player's interest in the game and motivation to continue the game can be further raised.

Further, as previously described, the items A1 to A3 among the items A1 to A4 are set as triggers for exhibiting effect E1 (defense power up), effect E2 (attack power up), and effect E3 (chips given) as specific effects on the character card C1, and a lottery for exhibiting any of these effects E1, E2, and E3 is held based on the calculation results of the "degrees of intimacy" in addition to the "probabilities of occurrence" of the effects E1, E2, and E3. Thus, since the influences of the "levels" set for the items A1 to A4 to change the "degrees of intimacy" can be taken into account in exhibiting the specific effects, the skills and difficulty levels of the game can be enhanced to further improve the fun of and interest in the game.

As mentioned above, the invention disclosed herein is not limited to the aforementioned embodiments and the variations already described, and various modifications are possible as long as the gist of the invention is not changed. For example, the configuration of the server 100 shown in FIG. 1 is also adapted to the client computer 21 and the mobile terminal 22 as terminal devices 2 despite some differences in throughput and the like. Conversely, the client computer 21 and the mobile terminal 22 can be used as servers 100, i.e., any of computers connected through the network 200 can function as a server.

Further, in the server 100, mass-storage devices such as a hard disk and an SSD may be used to perform functions equivalent to those of the ROM 102, the RAM 103, the external memory 106, and the memory device loaded into the slot drive 108. These storage devices may not be made redundant by a RAID, or may not be connected to the computing unit 101 through the transmission path 120. For example, these storage devices may be connected to any other external apparatus through the network 200 as part of cloud computing.

Further, the network interfaces in the server 100 and the terminal device 2 may be either of wireless LAN devices and wired LAN devices, and the network interfaces may be internally mounted, or may be of an external device type such as a LAN card. Further, a game machine connectable to the network 200 may be used as the terminal device 2. In addition, for example, an online karaoke machine can also be used.

The game settings are also not limited to the specific examples in the aforementioned embodiments, and further variations shown below can also be cited.

A third embodiment shows an example of a mode in which a player owns multiple character cards, and when the player feeds too much food item to a specific character card, the "degree of intimacy" of the specific character card is reduced. In this case, such a setting that character cards other than the specific character card develops a "feeling of jealousy over," a "rivalry with," and an "obsession with" the specific character card fed with much food as an interpretation of the perspective of the game world, and this results in a reduction in the "degree of intimacy" between the specific character card and the player can be assumed. In this case, if the amount of food item determined to be too much to feed the specific character card is prescribed and the "degree of intimacy" is reduced without exception each time the amount of feed exceeds the prescribed amount, the game balance may be lost. Therefore, even when the amount of feed reaches the prescribed amount, a lottery or the like may be held to reduce the "degree of intimacy" with a certain probability.

A fourth embodiment has a procedure in which step SP50 shown in FIG. 1 is not executed immediately when the "degree of intimacy" is greater than or equal to Smax, and items for exhibiting specific effects are synthesized with the character card C1 in step SP50 to exhibit the specific effects. The items A1, A2, and A3 to which the effects E1, E2, and E3 are set as described in the second embodiment can be exemplified as such items to exhibit the specific effects. In this case, Smax functions as a threshold value for the "degree of intimacy" that can exhibit the specific effects.

In this embodiment and the second embodiment, the player may be made to recognize that the effects E1, E2, and E3 are set to the items A1, A2, and A3. Specifically, in this case, an appropriate method may be used to display, on the screen 2a of the terminal device 2, that each of the items A1, A2, and A3 are specified to exhibit each of the effects E1, E2, and E3, for example, when the "degree of intimacy" exceeds Smax. Alternatively, rendition may be provided when the character card C1 is synthesized with the items A1, A2, and A3 so that the player can understand that each of the items A1, A2, and A3 are specified to exhibit each of the effects E1, E2, and E3. Further, the items A1, A2, and A3 may be displayed in a display form (such as a differentiable color, shape, size, or flashing of a moving image) different from that of any item, for example, item A4 to which no effect is set.

A fifth embodiment has such a structure that does not merely change the "degree of intimacy" of a character card according the "level" of a single item, or in addition to that, the structure can also change the "degree of intimacy" of the character card C1 according to a combination of two or more items. More specifically, for example, such a structure that adds a larger increment of the "degree of intimacy" than the case where the items A1 and A2 are synthesized independently using an analogy from the fact that a combination of both when the item A1 is yogurt and the item A2 is a fruit sauce can be more tasty in the real world can be cited. At this time, for example, if the item A3 is the same kind of fruit as the fruit sauce of the item A2 and is further combined, the increment of the "degree of intimacy" may be further increased. In other cases, similar settings can be made, such as a case where two or more items of foods or cooking methods that are said to be good nutritionally in the real world are combined. Further, a structure for making a "level" initially set to each item higher when these items A1, A1, and A3 are selected at the same time without changing the "degree of intimacy" can be adopted.

Conversely, a structure for making the increment of the degree of intimacy smaller or the degree of intimacy lower than the case of synthesizing these items independently when items of foods or cooking methods are combined, where the combination of foods is said to be bad to be eaten together in the real world (regardless of the presence or absence of a scientific basis), can be adopted. Even in this case, the structure may reduce the "level" initially set to each item when these items are selected at the same time, rather than changing the "degree of intimacy."

In a sixth embodiment, when the "levels" of the items (the items A1 and A2 in the examples of the first embodiment and the second embodiment) selected by the player increase the "degree of intimacy" in a state where the "degree of intimacy" of the character card C1 exceeds a predetermined value, the setting may be made to reduce the previous "degree of intimacy" in an opposite manner. Since a state where the "degree of intimacy" of the character card C1 is already high enough is often assumed as a result of giving the liked item A1 or loved item A2 a lot, a structure of reducing the previous "degree of intimacy" can be adopted using an analogy from the real world that the character card would be already surfeited even if the item of the same kind of liked food or loved food is further fed.

In a seventh embodiment, when the game is a social game that allows multiple players to participate therein, the structure may be such that, an item selected by a player P1 and a character card owned by another player P2 among the multiple players can be combined and synthesized, and vice versa. In these cases, the "degree of intimacy" between the player P2 and the character card can be changed based on the "personality" provided for the character card of the player P2 and the "level" of the item selected by the player P1 with respect to the "personality." Such a structure can facilitate the communication between the player P1 the player P2 participating in the social game such as exchange and cooperation therebetween, contributing to the vitalization of the social game as a whole.

In this embodiment, the "levels" set for the items may be made different for each of character cards owned by the players P1 and P2, respectively. For example, such a structure that the "level" of apple as the item A1 is set to "like" as the preference of the character card of the player P1, whereas "dislike" is set as the preference of the character card of the player P2 is cited. Another structure is that any of display forms of the character cards owned by the players P1 and P2, respectively, the items A1 to A4, and rendition may be made different from one another. As the rendition effects, various techniques allowing the players to recognize the effects can be adopted in the same manner as the rendition upon the synthesis between the character card and the items mentioned above. These display forms may be changed or deformed based, for example, on differences among items as second game contents, or they can be changed or deformed based on differences among character cards as first game contents. The timing of performing the rendition is not limited to the time of synthesizing both.

As described above, the program and the control method for the game system of the invention disclosed herein can add unprecedented new values to game content owned by a player(s), give an element of surprise to improve the fun of and interest in the game drastically compared with the conventional, and enhance the player's interest in the game and motivation to continue the game. Therefore, it is possible to make wide and effective use of the invention in areas related to games using game content, for games in general (particularly those including social game elements), which are delivered, provided, and performed particularly in a server-client type network structure, software and hardware related technologies in general, which are related to delivering, providing, and performing the games, and further activities of designing, manufacturing, and selling the games.

DESCRIPTION OF REFERENCE NUMERALS

1: game system
2: terminal device
2a: screen
21: client computer (terminal device)
22: mobile terminal (terminal device)
31, 32, 33, 34: gauge representing calculated "degree of intimacy" (a characteristic parameter of a first game content)
41, 42, 43, 44: FIG.
100: server (computer)
101: computing unit (control unit)
102: ROM (information storage unit)
103: RAM (information storage unit)
104: external interface
105: input unit
106: external memory
107: image processing unit
108: slot drive
109: audio processing unit
110: network interface
111: display monitor
112: speaker device
120: transmission path
131: server communication unit
132: server storage unit
133: server processing unit
134: control unit
135: battle starting unit
136: player entry unit
137: battle progressing unit
138: reward imparting unit
141: terminal communication unit
142: terminal storage unit
143: operation unit
144: display unit
145: terminal processing unit
146: browsing execution unit
200: network (communication line)
A1 to A4: item

What is claimed is:

1. A server device that provides a game using a first game content and a plurality of second game contents different from the first game content, the server device comprising:
an information storage unit for storing information related to the game; and
a control unit for accessing the information and executing an operation related to the game, wherein the control unit is configured to:
set a personality to the first game content;
set a characteristic parameter of the first game content representing a degree of intimacy between the first game content and a player;
set a level for each of the second game contents, as one of characteristic parameters of the second game contents, each level associated with the personality of the first game content, the level being concealed from the player, the plurality of second game contents including at least a first type of second game content for which a positive level is set and a second type of second game content for which a negative level is set;
receive, from a terminal device, a selection of one or more second game contents of the plurality of second game contents by the player;
change the parameter representing the degree of intimacy between the first game content and the player by a predetermined rate by synthesizing the first game content and the selected one or more second game contents, wherein the predetermined rate of changing the parameter for each second game content is based on the personality of the first game content and the level of the second game contents, the predetermined rate is positive when the level of the second game content is positive, and the predetermined rate is negative when the level of the second game content is negative;
receive, from the terminal device, a selection of two or more second game contents of the plurality of second game contents by the player;

when the selection of the two or more second game contents selects a predetermined combination of second game contents, change the parameter representing the degree of intimacy between the first game content and the player by a predetermined rate that is different from a sum of the predetermined rate of changing the parameter for each of the two or more second game contents; and cause the terminal device of the player to present a rendition of the synthesized content based on the predetermined rate of changing the parameter.

2. The server device according to claim 1, wherein the control unit is further configured to make different any of display forms of the first game content, the second game content, and rendition according to the second game content.

3. The server device according to claim 1, wherein the control unit is further configured to exhibit a specific effect based on the degree of intimacy.

4. The server device according to claim 3, wherein the specific effect is to enable the first game content to use a predetermined skill and/or to change ability of the first game content.

5. The server device according to claim 3, wherein the control unit is further configured to:
set a specific second game content among the second game contents as a trigger to exhibit the specific effect and set an appearance probability of the specific effect to the specific second game content as the trigger; and
exhibit the specific effect based on the degree of intimacy and the appearance probability.

6. The server device according to claim 1, wherein the control unit is further configured to inversely reduce the degree of intimacy, when the level of the second game content selected by the player increases the degree of intimacy in a state where the characteristic parameter of the first game content exceeds a predetermined value.

7. The server device according to claim 1, wherein the control unit is further configured to cause the terminal device of the player to present the second game contents for player selection while concealing the respective level of each of the second game contents.

8. A method for controlling a server device having an information storage unit storing information related to a game using a first game content and a plurality of second game contents different from the first game content, and a control unit for accessing the information and performing calculations related to the game, the method comprising:
by the control unit, setting a personality to the first game content; by the control unit, setting a characteristic parameter of the first game content representing a degree of intimacy between the first game content and a player;
by the control unit, setting a level for each of the second game contents, as one of characteristic parameters of the second game contents, each level associated with the personality of the first game content, the level being concealed from the player, the plurality of second game contents including at least a first type of second game content for which a positive level is set and a second type of second game content for which a negative level is set;
by the control unit, receiving, from a terminal device, a selection of one or more second game contents of the plurality of second game contents by the player;
by the control unit, changing the parameter representing the degree of intimacy between the first game content and the player by a predetermined rate by synthesizing the first game content and the selected one or more second game contents, wherein the predetermined rate of changing the parameter for each second game content is based on the personality of the first game content and the level of the second game contents, the predetermined rate is positive when the level of the second game content is positive, and the predetermined rate is negative when the level of the second game content is negative;
by the control unit, receiving, from the terminal device, a selection of two or more second game contents of the plurality of second game contents by the player;
when the selection of the two or more second game contents selects a predetermined combination of second game contents, by the control unit, changing the parameter representing the degree of intimacy between the first game content and the player by a predetermined rate that is different from a sum of the predetermined rate of changing the parameter for each of the two or more second game contents; and
by the control unit, causing the terminal device of the player to present a rendition of the synthesized content based on the predetermined rate of changing the parameter.

9. The method according to claim 8, further comprising:
by the control unit, making different any of display forms of the first game content, the second game content, and rendition according to the second game content.

10. The method according to claim 8, further comprising:
by the control unit, exhibiting a specific effect based on the degree of intimacy.

11. The method according to claim 10, wherein the specific effect is to enable the first game content to use a predetermined skill and/or to change ability of the first game content.

12. The method according to claim 10, further comprising:
by the control unit, setting a specific second game content among the second game contents as a trigger to exhibit the specific effect and setting an appearance probability of the specific effect to the specific second game content as the trigger; and
by the control unit, exhibiting the specific effect based on the degree of intimacy and the appearance probability.

13. The method according to claim 8, further comprising:
by the control unit, inversely reducing the degree of intimacy, when the level of the second game content selected by the player increases the degree of intimacy in a state where the characteristic parameter of the first game content exceeds a predetermined value.

14. The method according to claim 8, further comprising:
by the control unit, causing the terminal device of the player to present the second game contents for player selection while concealing the respective level of each of the second game contents.

15. A non-transitory computer-readable recording medium having recorded thereon instructions to be executed on a computer, the instructions causing the computer to:
access information related to a game using a first game content and a plurality of second game contents different from the first game content; set a personality to the first game content;
set a characteristic parameter of the first game content representing a degree of intimacy between the first game content and a player;
set a level for each of the second game contents, as one of characteristic parameters of the second game contents, each level associated with the personality of the first game content, the level being concealed from the player, the plurality of second game contents including at least a first type of second game content for which a positive level is set and a second type of second game content for which a negative level is set;

receive, from a terminal device, a selection of one or more second game contents of the plurality of second game contents by the player;

change the parameter representing the degree of intimacy between the first game content and the player by a predetermined rate by synthesizing the first game content and the selected one or more second game contents, wherein the predetermined rate of changing the parameter for each second game content is based on the personality of the first game content and the level of the second game contents, the predetermined rate is positive when the level of the second game content is positive, and the predetermined rate is negative when the level of the second game content is negative;

receive, from the terminal device, a selection of two or more second game contents of the plurality of second game contents by the player;

when the selection of the two or more second game contents selects a predetermined combination of second game contents, change the parameter representing the degree of intimacy between the first game content and the player by a predetermined rate that is different from a sum of the predetermined rate of changing the parameter for each of the two or more second game contents; and cause the terminal device of the player to automatically present a rendition of the synthesized content based on the predetermined rate of changing the parameter.

16. The non-transitory computer readable recording medium according to claim 15, wherein the instructions further cause the computer to make different any of display forms of the first game content, the second game content, and rendition according to the second game content.

17. The non-transitory computer readable recording medium according to claim 15, wherein the instructions further cause the computer to exhibit a specific effect based on the degree of intimacy.

18. The non-transitory computer readable recording medium according to claim 17, wherein the specific effect is to enable the first game content to use a predetermined skill and/or to change ability of the first game content.

19. The non-transitory computer readable recording medium according to claim 17, wherein the instructions further cause the computer to:
set a specific second game content among the second game contents as a trigger to exhibit the specific effect and set an appearance probability of the specific effect to the specific second game content as the trigger; and
exhibit the specific effect based on the degree of intimacy and the appearance probability.

20. The non-transitory computer readable recording medium according to claim 15, wherein the instructions further cause the computer to inversely reduce the degree of intimacy, when the level of the second game content selected by the player increases the degree of intimacy in a state where the characteristic parameter of the first game content exceeds a predetermined value.

21. The non-transitory computer readable recording medium according to claim 15, wherein the instructions further cause the computer to cause the terminal device of the player to present the second game contents for player selection while concealing the respective level of each of the second game contents.

* * * * *